United States Patent
Schueppstuhl et al.

(10) Patent No.: US 12,467,878 B2
(45) Date of Patent: Nov. 11, 2025

(54) APPARATUS FOR BORESCOPE INSPECTION OF TECHNICAL DEVICES

(71) Applicant: Lufthansa Technik AG, Hamburg (DE)

(72) Inventors: Thorsten Schueppstuhl, Hamburg (DE); Lukas Bath, Hamburg (DE); Maik Dammann, Hamburg (DE); Mattes Schumann, Hamburg (DE); Tarek Mostafa, Schoeffengrund (DE); Oliver Neumann, Solms (DE); Werner Neddermeyer, Echternach (LU); Sven Rasche, Hamburg (DE); Tomas Domaschke, Hamburg (DE); Soenke Bahr, Darmstadt (DE); Jan Oke Peters, Hamburg (DE); Michael Thies, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 155 days.

(21) Appl. No.: 17/910,354

(22) PCT Filed: Mar. 5, 2021

(86) PCT No.: PCT/EP2021/055564
§ 371 (c)(1),
(2) Date: Sep. 9, 2022

(87) PCT Pub. No.: WO2021/180582
PCT Pub. Date: Sep. 16, 2021

(65) Prior Publication Data
US 2023/0120378 A1    Apr. 20, 2023

(30) Foreign Application Priority Data

Mar. 10, 2020   (DE) ................... 10 2020 106 508.6

(51) Int. Cl.
*G01N 21/954*   (2006.01)

(52) U.S. Cl.
CPC ... *G01N 21/954* (2013.01); *G01N 2021/9542* (2013.01)

(58) Field of Classification Search
CPC .......... G01N 21/954; G01N 2021/9542; A61B 1/00154; A61B 1/0054; A61B 1/00022;
(Continued)

(56) References Cited

U.S. PATENT DOCUMENTS 3,690,775 A * 9/1972 Cousins ............. G02B 23/2476
356/241.4
3,778,170 A 12/1973 Howell et al.
(Continued)

FOREIGN PATENT DOCUMENTS

CN    105208913 A    12/2015
CN    107084052 A    8/2017
(Continued)

*Primary Examiner* — Michael A Lyons
(74) *Attorney, Agent, or Firm* — LEYDIG, VOIT & MAYER, LTD.

(57) ABSTRACT

An apparatus investigates a technical device using a borescope. The apparatus has: a guide tube which is introducible through a borescope opening on the technical device to be inspected using the borescope; and a repeatedly plastically deformable carrier configured to guide a borescope head arranged at one end of the carrier. The guide tube is designed to deform the carrier during the passage of the carrier through the guide tube.

14 Claims, 1 Drawing Sheet

(58) Field of Classification Search
CPC ..... A61B 1/05; A61B 1/3132; A61B 1/00062;
A61B 1/0676; A61B 1/267; A61B 1/313;
A61B 1/0055; H04N 5/2253; H04N
2005/2255; G02B 23/2476
USPC ......... 356/241.1, 241.4, 241.6, 241.3, 241.5;
385/118; 606/8, 194, 114, 118, 101
See application file for complete search history.

(56) References Cited

U.S. PATENT DOCUMENTS

| | | | |
|---|---|---|---|
| 4,216,802 A | | 8/1980 | Bonnes et al. |
| 4,298,312 A | * | 11/1981 | MacKenzie ........... F01D 21/003 |
| | | | 385/119 |
| 4,790,624 A | | 12/1988 | Van Hoye et al. |
| 5,417,546 A | | 5/1995 | Smith et al. |
| 2005/0006009 A1 | * | 1/2005 | Esashi ............... A61M 25/0138 |
| | | | 148/518 |
| 2005/0162643 A1 | | 7/2005 | Karpen |
| 2010/0069716 A1 | * | 3/2010 | Chin .................. A61B 1/00071 |
| | | | 600/114 |
| 2016/0000301 A1 | | 1/2016 | Langell et al. |
| 2016/0025653 A1 | | 1/2016 | Jalilian et al. |
| 2017/0176737 A1 | | 6/2017 | Haffner et al. |
| 2020/0319119 A1 | * | 10/2020 | Peters ................ G02B 23/2476 |
| 2023/0121496 A1 | * | 4/2023 | Peters .................... B25J 9/1697 |
| | | | 356/241.4 |

FOREIGN PATENT DOCUMENTS

| | | |
|---|---|---|
| DE | 102016110536 A1 | 1/2017 |
| DE | 202019102209 U1 | 4/2019 |
| EP | 1010440 A2 | 6/2000 |
| JP | 201214128 A | 1/2012 |
| WO | WO 2010030764 A2 | 3/2010 |
| WO | WO 2016172162 A1 | 10/2016 |

* cited by examiner

APPARATUS FOR BORESCOPE INSPECTION OF TECHNICAL DEVICES

CROSS REFERENCE TO RELATED APPLICATIONS

This application is a U.S. National Phase application under 35 U.S.C. § 371 of International Application No. PCT/EP2021/055564, filed on Mar. 5, 2021, and claims benefit to German Patent Application No. DE 10 2020 106 508.6, filed on Mar. 10, 2020. The International Application was published in German on Sep. 16, 2021 as WO 2021/180582 A1 under PCT Article 21(2).

FIELD

The present disclosure relates to an apparatus for inspecting technical devices, in particular aircraft engines and their components such as their combustion chambers, using a borescope, and to an assembly comprising such an apparatus.

BACKGROUND

Borescopes are used to inspect technical devices in regions which cannot be viewed directly. The borescopes can be introduced into the regions in question through small openings and provide a glimpse into regions which cannot otherwise be viewed either directly via an optical system or alternatively by displaying a video image (also referred to as a video borescope) recorded by an appropriate sensor system at the borescope tip.

Borescopes are used, for example, when inspecting aircraft engines in order to see inside the engine without the effort of having to dismantle it. It is here necessary or at least desirable to thoroughly assess and document the region, at least for individual regions of the aircraft engine such as, for example, the combustion chamber.

To inspect the inside of the combustion chamber, use is currently made of a video borescope with a flexible shaft which can be guided manually through the combustion chamber. To do this, the flexible borescope is guided along the complete inner circumference of the combustion chamber and then slowly withdrawn. The images captured by the borescope are recorded during the withdrawal. Attempts are made here to ensure that the complete circumference of the usually annular combustion chamber is captured. If a potential problem location in the combustion chamber is thus identified, manual three-dimensional (3D) capturing of the corresponding location using special 3D borescopes suitable for this purpose can then be carried out.

Because the borescope with a flexible shaft is guided manually, complete and reproducible documentation of the condition of a combustion chamber is, however, rarely possible. Moreover, in particular the subsequent 3D capturing of potential problem locations is very expensive and time-consuming.

SUMMARY

In an embodiment, the present disclosure provides an apparatus for investigating a technical device using a borescope. The apparatus has: a guide tube which is introducible through a borescope opening on the technical device to be inspected using the borescope; and a repeatedly plastically deformable carrier configured to guide a borescope head arranged at one end of the carrier. The guide tube is designed to deform the carrier during the passage of the carrier through the guide tube.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
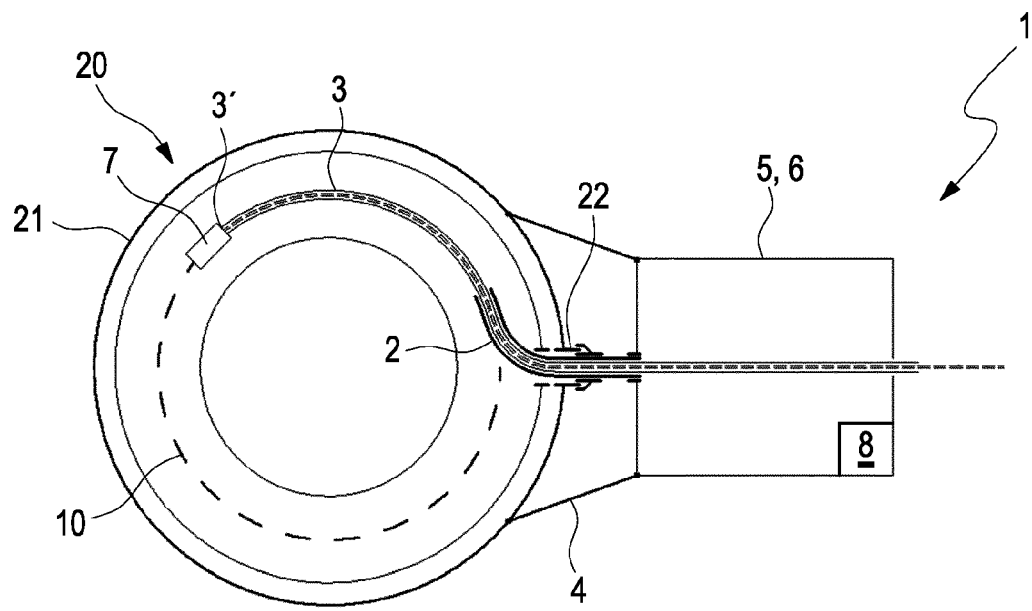
FIG. 1 shows a schematic illustration of an apparatus according to the invention used on a combustion chamber of an aircraft engine.

In an embodiment, the present disclosure provides an apparatus for investigation using a borescope by means of which the inspection of technical devices such as, for example, aircraft engines can be simplified and improved.

The present disclosure accordingly relates to an apparatus for investigating a technical device using a borescope, comprising a guide tube which can be introduced through a borescope opening on a technical device to be inspected using a borescope, and a repeatedly plastically deformable carrier element for guiding a borescope head arranged at one end of the carrier element, wherein the guide tube is designed to deform the carrier element during the passage of the carrier element through the guide tube.

The present disclosure furthermore relates to an assembly comprising an apparatus according to an aspect of the present disclosure and a flexible borescope, wherein the carrier element of the apparatus has a tubular design and the borescope is introduced into the carrier element.

Some terms used in connection with the present disclosure will first be explained.

The "borescope head" is that part of a borescope which ultimately determines the recording region of the borescope. In the case of a purely optical borescope, this corresponds, for example, to the borescope lens or the inlet surface of a light guide which defines the ultimate recording cone; in the case of a video borescope, this is the recording region of the image capture sensors provided for this purpose. It is irrelevant here whether 2D image capture within the visible range, recording within the non-visible range (for example, the infrared range), and/or the capture of 3D data, for example by triangulation, is effected via the borescope optical system. The borescope head can be arranged on a rigid or flexible shaft. It is, however, also possible to arrange the borescope head without its own structural shaft on another element such as, for example, the carrier element.

The apparatus according to an aspect of the present disclosure enables a borescope head to be guided inside a technical device without any contact with components along a reproducible path, for example a circular path. The inventors have recognized that, by virtue of the geometry of some technical devices such as, for example, aircraft engines, and the paths required for inspection using a borescope, a completely preformed guide apparatus which can be introduced into the technical device is not possible.

According to aspects of the present disclosure, a plastically deformable carrier element is used, the ultimate shape of which when introduced into a technical device is specified by a guide tube arranged on the technical device. The guide tube is therefore designed to plastically deform the carrier element during the passage of the carrier element through the guide tube. The guide tube thus also predetermines the point from which the carrier element actually projects freely into the technical device. By means of a suitable design and arrangement of the guide tube and possibly suitable predeformation of the carrier element (for example, bending or twisting deformation), a predetermined path of the carrier element inside the technical device can be obtained reproducibly. A borescope head, guided by the carrier element, can then also be guided along this path with no direct contact with the technical device. The path can here be chosen such that the borescope is guided, at a suitable distance, past the surfaces to be investigated inside the technical device. The apparatus according to an aspect of the present disclosure thus not only enables reproducible inspection using a borescope but also can often improve the quality of the data obtained by the inspection using a borescope. These data can be image data or alternatively, for example, 3D surface data obtained, for example, by triangulation.

According to the present disclosure, the carrier element is repeatedly plastically deformable, wherein this deformability is of a type such that actual deformation is possible or also actually takes place during the passage of the carrier element through the guide tube. "Repeatedly plastically deformable" here refers to the property where, when deformed, the carrier element displays no or only very few signs of fatigue and the carrier element essentially retains the shape achieved by deformation, in particular a possibly elastic component of the deformation is smaller than the plastic component of the deformation of the carrier element. The carrier element can preferably be deformed for multiple cycles, for example at least for at least 20 cycles, more preferably for at least 50 cycles, as part of the deformations to be expected during use of the apparatus according to an aspect of the present disclosure, without there being any noticeable signs of fatigue.

The use of the term carrier element also underlines the fact that the shape, obtained after deformation, of the carrier element and with the borescope head also arranged thereon is essentially retained by the carrier element in this respect thus being self-supporting. A few types of tube are known from the prior art which are fundamentally suited as a carrier element of the apparatus according to an aspect of the present disclosure. It is particularly advantageous and therefore preferred if the carrier element is a material composite tube. The carrier element can here comprise a core made from a wound strip of metal, wherein the strip of metal is preferably an aluminum strip and/or is wound lengthwise. In order to preserve the dimensional stability of the carrier element after deformation, a plastic, preferably polyethylene covering of the core is furthermore preferably provided. A protective coating, preferably a protective film, can be provided on the side of the core situated opposite the covering such that in this case the core is surrounded completely by the covering and the protective coating. A smooth surface of the carrier element on its outer and inner side can generally be achieved as a result. The risk of damage to a component of the technical device to be inspected using a borescope in the case of (unintentional) contact with the carrier element is furthermore reduced. Suitable tubes at the time of the priority date are available, for example, under the trade names "Dekabon" or under the "Synflex" brand of the Eaton Corporation, USA, and are described in detail, for example, in U.S. Pat. No. 4,216,802.

The borescope head can be arranged directly on the carrier element, wherein the supply lines to the borescope, either cables or light guides, can be guided through or along the carrier element. It is, however, also possible that the borescope head is arranged on a flexible borescope shaft which is guided through the carrier element which then has, for example, a tubular form for this purpose.

The guide tube of the apparatus can be designed for direct fastening on the technical device in a distinct and hence reproducibly recoverable position, for example by the guide tube being fastened at the borescope openings themselves or surrounding fastening points on the technical device. It is, however, also possible that a guide tube fastening means is provided which, although it can likewise be fastened in a distinct position on the technical device, it is however permitted to modify the situation of the guide tube relative to the guide tube fastening means systematically and preferably controllably. It is then possible, after the guide tube fastening means has been fastened to the technical device, to guide the carrier element successively along different paths inside the technical device by suitable modification of the situation of the guide tube. The different paths are here furthermore completely reproducible. Borescope openings can here be openings provided for this purpose but also, for example in the case of an aircraft engine, spark plug openings, fuel nozzle openings, or maintenance openings.

The apparatus can preferably comprise a predeforming unit for predeforming the carrier element before the passage of the carrier element through the guide tube. Even when deformation of the carrier element is effected by the guide tube when introduced into an aircraft engine, the ultimate shape obtained of the carrier element and hence the path along which a borescope is guided through the aircraft engine are jointly determined by the form of the carrier element before passage through the guide tube. This applies in particular for deformations such as twisting deformation but also for bending deformation. It is preferred if the predeforming unit is controllable. Different paths for the carrier element inside the aircraft engine can be achieved by suitable control of the predeforming unit.

It is preferred if the apparatus has a drive unit for the carrier element and/or a flexible borescope guided through the carrier element. The drive unit can here be designed for advancing the carrier element and/or a borescope guided therein. It is preferred if the drive unit is additionally designed to rotate the carrier element and/or a borescope guided therein.

Alternatively or additionally to the above options for influencing the ultimate path of the carrier element inside the technical device, the guide tube can be adjusted adaptively, i.e. its shape can be fundamentally modified. The adaptive adjustment can here take place mechanically, thermomechanically, and/or electromechanically.

A probe unit for determining the position and/or the orientation of the introduction end of the carrier element can be provided at that end of the carrier element which is to be introduced into the aircraft engine. It is possible to check via a corresponding probe unit whether the carrier element follows a predetermined path. The probe unit can be designed for determining the position using any known measurement principle, for example time-of-flight analysis of the radio or light signals emitted and/or received by the probe unit. Determining the position on the basis of image evaluation is also possible, for which purpose the probe unit comprises suitable image capture sensors. The probe unit can also be integrated into the borescope head.

The apparatus preferably comprises a control apparatus for controlling the guide tube fastening means, the predeforming unit, the adaptive adjustment of the guide tube, and/or the drive unit. It is preferred here if the control is effected taking into account the positional and/or orientational information of the borescope head, obtained via a probe unit or by the borescope guided through the carrier element. By means of the corresponding positional and/or orientational information which can be calculated either by a probe unit or, depending on the design of the borescope guided through the apparatus, also via the guided borescope, the actual situation and/or orientation can be compared with the predetermined path and, if a deviation is found, suitable countermeasures can be initiated.

In addition to an apparatus according to an aspect of the present disclosure with a carrier element with a tubular configuration, the assembly according to an aspect of the present disclosure also comprises a borescope which is introduced into the carrier element of the apparatus. Reference should be made to the above embodiments for an explanation of the assembly.

The borescope head can be a video borescope in which an electronic image capture unit for generating image and/or video data is provided. It can also be designed to capture 3D surface data, for example by triangulation based on image data from two image capture units arranged adjacent to each other.

The technical device to be inspected using a borescope can in particular be a gas turbine or an aircraft engine.

Figure 2:
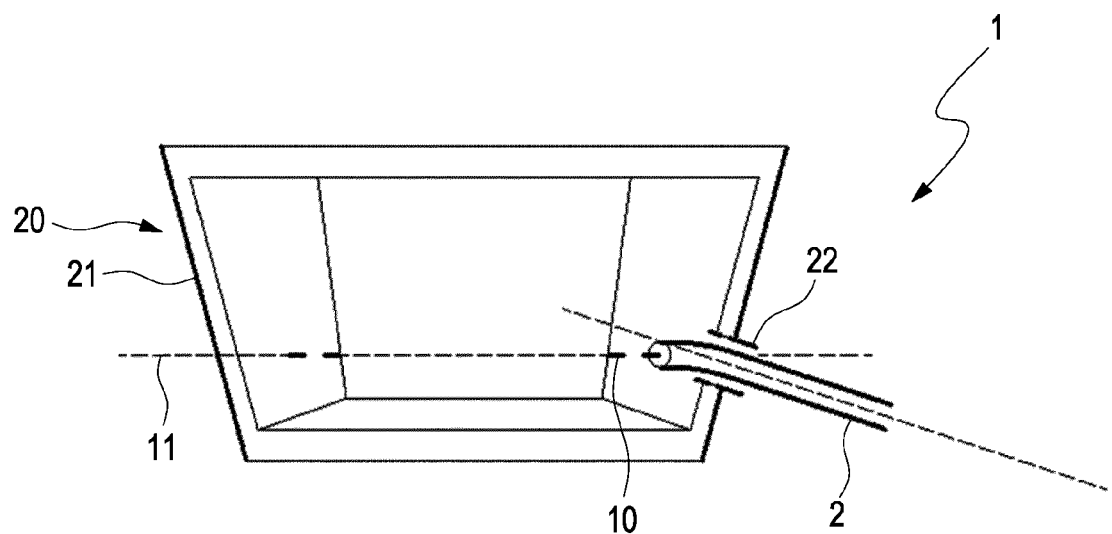
FIG. 2 shows a schematic view in section of FIG. 1.

The use of an apparatus 1 for inspecting the combustion chamber 21 of an aircraft engine, as a technical device 20, using a borescope is drawn in FIGS. 1 and 2. For reasons of clarity, only the combustion chamber 21 of the aircraft engine 20 is illustrated here. The apparatus can, however, be used in particular in the situation in which the combustion chamber 21 is installed in an aircraft engine 20.

The apparatus comprises a guide tube 2 which is fastened to the aircraft engine 20 via a guide tube fastening means 4 and projects into the combustion chamber 21 through a borescope opening 22. The guide tube fastening means 4 can here be controlled by the control apparatus 8 in such a way that the situation of the guide tube 2 relative to the borescope opening 22 can be modified systematically.

A repeatedly plastically deformable carrier element 3 is introduced into the guide tube 2. The carrier element 3 is here a material composite tube comprising a core consisting of an aluminum strip wound lengthwise, an outer covering of polyethylene, and a protective film as a protective coating on the inner side. The carrier element 3 is self-supporting or alternatively supports the borescope or the borescope head 7 such that it follows the path inside the combustion chamber 21 after its passage through the guide tube 2, during which deformation takes place.

It is fundamentally possible that a flexible borescope is guided through the tubular carrier element 3 for the actual inspection using a borescope. In the exemplary embodiment illustrated, however, a borescope head 7 is arranged at that end 3' of the carrier element 3 which is introduced into the combustion chamber 21, it being possible for images generated by image capture sensors to be communicated to a control mechanism 8 via data lines routed through the carrier element 3 and passed on from there.

In order to ensure that the carrier element 3 actually runs along the path 10 illustrated, which in this example is intended to run within a plane 11, a predeforming unit 5 is provided by means of which the carrier element 3 is predeformed, in particular in terms of twisting, before its passage through the guide tube 2 in order thus to compensate any torsional deformations which can occur during the deformation in the guide tube 2 because of the design of the carrier element 3.

Integrally configured with the predeforming unit 5 is a drive unit 6 by means of which the advancing, i.e. the ultimate passage of the carrier element 3 through the guide tube 2 is achieved.

The predeforming unit 5 and the drive unit 6 are likewise controlled by the control unit 8.

Integrally configured with the borescope head 7 is a probe unit by means of which the position and orientation of the introduction end 3' of the carrier element 3 or the borescope head 7 can be calculated. This information is made available to the control unit 8 which can check that the path 10 is being followed and, if necessary, can act on the carrier element 3 by suitable activation of the guide tube fastening means 4, the predeforming unit 5, and/or the drive unit 6 such that the position and orientation calculated by the probe unit corresponds to the desired position along the path 10.

The probe unit can rely on any known method for determining its position and orientation. It is, however, also possible that the probe unit makes use of the image capture sensors of the borescope head. The position and orientation of the borescope head 7 or the introduction end 3' of the carrier element 3 can be determined and be taken into account by the control mechanism 8, as described, by suitable analysis of the image and/or 3D data obtained by the borescope head 7.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for investigating a technical device using a borescope, the apparatus comprising:
   a guide tube which is introducible through a borescope opening on the technical device to be inspected using the borescope and configured to be arranged on the technical device; and a repeatedly plastically deformable carrier configured to guide a borescope head arranged at one end of the carrier, wherein the guide tube is designed to deform the carrier during the passage of the carrier through the guide tube such that a shape of the deformed carrier when introduced into the technical device is specified by the guide tube arranged on the technical device.

2. The apparatus as claimed in claim 1, wherein the carrier is a material composite tube.

3. The apparatus as claimed in claim 2, wherein the material composite tube comprises a core consisting of a wound aluminum strip, the material composite tube having an inner side and further comprising a plastic covering or a protective coating on the inner side.

4. The apparatus of claim 3, wherein the wound aluminum strip is wound lengthwise.

5. The apparatus as claimed in claim 1, wherein the guide tube is designed for fastening to the technical device in a distinct position.

6. The apparatus as claimed in claim 1, further comprising a predeforming unit configured to predeform, by twisting or bending, the carrier before the passage of the carrier through the guide tube, wherein the predeforming unit is controllable.

7. The apparatus as claimed in claim 1, wherein a drive is provided for the carrier and/or the borescope guided through the carrier.

8. The apparatus as claimed in claim 1, wherein the guide tube is adaptively adjustable.

9. The apparatus as claimed in claim 1, further comprising a probe configured to determine a position and/or orientation of an introduction end of the carrier and/or of the borescope head at that end of the carrier which is to be introduced into the technical device.

10. The apparatus as claimed in claim 9, wherein the probe is integral with the borescope head.

11. The apparatus as claimed in claim 1, wherein the borescope head is arranged directly on the carrier or on a flexible borescope shaft which is guidable through the carrier.

12. The apparatus as claimed in claim 1, further comprising a controller configured to control a guide tube fastener, a predeforming unit, and/or a drive, taking into account a positional and/or orientational information of an introduction end of the carrier and/or the borescope head, obtained via a probe or by the borescope guided through the carrier.

13. An assembly comprising the apparatus as claimed in claim 1 and the borescope comprising the borescope head, wherein the carrier of the apparatus has a tubular design and the borescope is introduced into the carrier of the apparatus.

14. The apparatus as claimed in claim 1, further comprising a guide tube fastener designed for fastening to the technical device in a distinct position, wherein the guide tube fastener is designed to modify the situation of the guide tube relative to the technical device systematically and controllably.

* * * * *